United States Patent [19]

August, Jr.

[11] Patent Number: 5,078,951
[45] Date of Patent: Jan. 7, 1992

[54] HIGH EFFICIENCY FAST NEUTRON THRESHOLD DEFLECTOR

[75] Inventor: Robert A. August, Jr., Laurel, Md.

[73] Assignee: The United States of America as represented by the Secretary of the Navy, Washington, D.C.

[21] Appl. No.: 560,959

[22] Filed: Aug. 1, 1990

[51] Int. Cl.$^5$ ............................................. G01T 3/00
[52] U.S. Cl. ............................ 376/154; 376/255; 376/155; 250/392
[58] Field of Search ............... 376/255, 154, 155, 254, 376/153; 250/390.01, 392

[56] References Cited

U.S. PATENT DOCUMENTS

| | | | |
|---|---|---|---|
| 2,809,313 | 10/1957 | Baer et al. | 376/154 |
| 3,598,996 | 8/1971 | Haebler et al. | 376/254 |
| 4,410,483 | 10/1983 | Tomoda | 376/154 |
| 4,927,593 | 5/1990 | Impink, Jr. et al. | 376/153 |

OTHER PUBLICATIONS

Glenn F. Knoll; Radiation Detection and Measurement; 1970; Chapter 15, Fast Fission Detection and Spectroscopy, pp. 562–570.

Primary Examiner—Brooks H. Hunt
Assistant Examiner—Frederick H. Voss
Attorney, Agent, or Firm—Thomas E. McDonnell; George Jameson

[57] ABSTRACT

A high-efficiency apparatus for detecting fast neutrons includes an assembly of disks of solid state charged particle detector material, or other appropriate charged particle detecting devices, disposed between adjacent thick (on the order of 1 mm) disks of fissionable material. The fissionable material must be an isotope that has a sharp increase in the neutron-induced fission cross section at a neutron energy of about 100 keV or greater, i.e., a fast neutron. An array of such assemblies housed in a thermal neutron shielding structure provides a threshold detector for fast neutrons resulting from neutron-induced fission of the fissionable material.

14 Claims, 1 Drawing Sheet

HIGH EFFICIENCY FAST NEUTRON THRESHOLD DEFLECTOR

BACKGROUND OF THE INVENTION

1. Field of the Invention

The present invention relates generally to detection apparatuses and, more particularly, to an apparatus for detecting neutrons. More specifically, the invention relates to a high-efficiency threshold detector of fast neutrons.

2. Prior Art

Neutron counters using materials sensitive to neutron-induced fission are known in the art. As a simple example, a counter sensitive to thermal neutrons could be constructed by depositing a thin coating of $^{235}U$ metal on the interior wall of a gas-filled proportional counter. The $^{235}U$ deposit should be thin enough that the primary fission fragments can escape the metal and be detected in the proportional counter.

A neutron counter that is sensitive to fast neutrons can be made by using a material with a higher threshold for neutron-induced fission, like $^{238}U$. The cross section for neutron-induced of $^{238}U$ rises rapidly from about $2.5 \times 10^{-4}$ b (where 1 b or barn = $10^{-24}$ cm$^2$) at 0.5 MeV (megaelectron volt) to over 1000 times greater at energies above 1.5 MeV. Therefore, a counter using $^{238}U$ as the sensitive material would only be sensitive to neutrons with incident energies above this cross section threshold, i.e., a "threshold detector".

A typical high-efficiency fast neutron detector first thermalizes the neutron by multiple scattering in a hydrogenous material, then detects the thermal neutrons in a proportional counter. All spectroscopic information is lost in the thermalization process, as is all information about the direction from which the neutron was incident upon the detector. These detectors typically have efficiencies of at least a few % for neutrons with energies in the hundreds of keV (kiloelectron volt) to the MeV range, or "fast" neutrons. Typical fast neutron spectrometry techniques, such as neutron time of flight, proton recoil telescopes, etc., suffer from efficiencies that are many orders of magnitude below this. Spectrometers using $^{10}B$ doped scintillators have been developed that achieve efficiencies in the few % range. However, the energy resolution is rather poor, being 55% to 33% full width at half maximum (fwhm) in the range from 0.5 to 5.7 MeV.

The fast neutron detection approach of the present invention avoids the multiple collision process of thermalization, and absorbs all of the neutron energy in one step via the fission reaction. There are a number of heavy elements that have relatively high, fast-neutron-induced fission cross sections. For example, $^{236}U$, $^{234}U$, $^{238}U$, $^{241}Am$ have fission cross sections for fast neutrons in the range of one barn. However, this is not an exhaustive list. Materials that meet the criterion of having a significant cross section for neutron-induced fission only for neutrons with energies above about 100 keV will be referred to hereafter as fast-fissionable material (FFM).

A problem is immediately apparent when the nature of the fission reaction is considered. When a fast neutron (a few Mev) induces a fission of a FFM, several hundred MeV of energy is released. Most of this energy is divided between two fission fragments; the rest is given to an average of three or more neutrons and released as gamma-rays. This neutron multiplicity more or less eliminates this system's usefulness as a neutron spectrometer.

It does not, however, eliminate the possibility of using it as a threshold detector for a yes/no discrimination between fast and slow neutrons. As an example, the reaction threshold for neutron-induced fission of $^{238}U$ is about 1.5 MeV, at which point the fission cross section rises sharply by a factor of 1000. This barrier will effectively discriminate between fast and slow neutrons. This discrimination would be further enhanced if a detector exploiting this reaction is also shielded by a thin layer of plastic heavily doped with $^{10}B$ or some other thermal neutron shield. Then, any thermal neutrons present would be greatly attenuated without seriously affecting the fast neutron flux being measured.

Passive variations of this idea have been done in the past by backing a fissionable foil with a film to record the tracks left by the fission products, and then counting the tracks after etching the film. Also, active fission fragments detectors have been used. These detectors use only very thin deposits of fissionable material so that the short range, on the order of microns, primary fission fragments will be able to escape from the fissionable material and be detected. This greatly limits the efficiencies for fast neutron detection that these detectors can achieve. Some examples, of the latter type of detectors can be found in U.S. Pat. Nos. 3,140,398, to Reinhardt et al.; 3,878,108, to Burgkhardt et al.; and 4,804,514 and 4,857,259 both to Bartko et al.

The neutron dosimeter of Reinhardt et al., for example, uses a composite foil of a nickel disk electroplated with a mixture of $^{235}U$, $^{237}Np$ and $^{238}U$ in specific proportions, to detect the neutron flux of a typical fission spectrum. The plated surface of the foil is mounted on a solid state surface barrier detector.

Burgkhardt et al. discloses a dosimeter to be worn on a finger which includes a fissionable foil of thorium or neptunium covered on one or both sides by one or more flexible detector foils made of a polycarbonate resin.

The two Bartko et al. patents describe neutron dosimeters which use different techniques to detect the ions released from a thin layer of fission material struck by neutrons. In the U.S. Pat. No. 4,804,514, the ions induce light pulses in a scintillator material disposed adjacent to the fission layer, and a photomultiplier converts the light pulses to electrical pulses. In the U.S. Pat. No. 4,857,259, a layer of fission material is disposed adjacent to a layer of material which changes its electrical conductivity in accordance with the density of implant ions from the fission material. A measurement of the conductivity provides information for determining neutron dose.

SUMMARY OF THE INVENTION

Accordingly, among the objects of the invention are: to provide a threshold detector of fast neutrons; to provide a detector of the foregoing type which has high efficiency; to provide a high efficiency detector of the foregoing type which is capable of using thick layers of a fission material in conjunction with charged particle detector material; and to provide a high-efficiency detector of the foregoing type which is capable of supplying information regarding the direction from which the fast neutron flux is incident.

These and other objects of the invention are attained in a fast neutron detector in which a laminate is formed of a disk of solid state charged particle detector material disposed between relatively thick layers of a fast fissionable material. A plurality of such laminates are assembled in a support housing to form the basic component for the detector. The detector includes a plurality of such components arranged in an array and enclosed within a thermal neutron shielding material.

DESCRIPTION OF THE INVENTION

The fast neutron detector of the present invention sandwiches together standard solid state charged particle detectors and thick disks of a fast-fissionable material (FFM). In preliminary work conducted by the inventor, the FFM chosen was $^{238}$U in the form of 1 mm thick disks. This is far too thick for the charged particle detector to observe the vast majority of the fission fragments that occur in the disk. However, the highly energetic and prolific (charged particles, neutrons and gamma-rays) nature of the fission reaction leads to secondary nuclear reactions and fission product decay particles. In particular, many of the electrons from B-decay of the fission products may be energetic enough to escape the $^{238}$U disks. This will increase the usable thickness of fissionable material by boosting the probability of a signal in the charged particle detector resulting from a fission in the disk. To positively identify an FFM as one that will work in this system, a measurable signal must be detected in the charged particle detector when the FFM/charged particle detector sandwich is exposed to a flux of fast neutrons. Physically, whether or not this will happen depends on the exact details of the fission decay scheme for that isotope. Therefore, it is quite possible for one FFM to work in this detector scheme while another isotope would not. The fission decay schemes are so complex that the only way to tell for certain whether or not a particular isotope will be a workable FFM is to test that material.

When the disk/charged particle detector sandwich was exposed to a $^{252}$Cf neutrons source, a significant increase in count-rate was seen in the charged particle detector. After accounting for the effects of neutrons on the solid state charged particle detector, the majority of this increase can only be accounted for as being the result of neutron-induced events in the $^{238}$U disk. Further experiments, where the incident neutron flux was moderated and the source-to-detector geometry varied, indicated that the neutron-induced events were due to the fast neutron component of the flux. Calculations using the results of experiments indicate that about half of the neutron-induced fissions in the $^{238}$U disk result in a signal in the charged particle detector.

Figure 1:
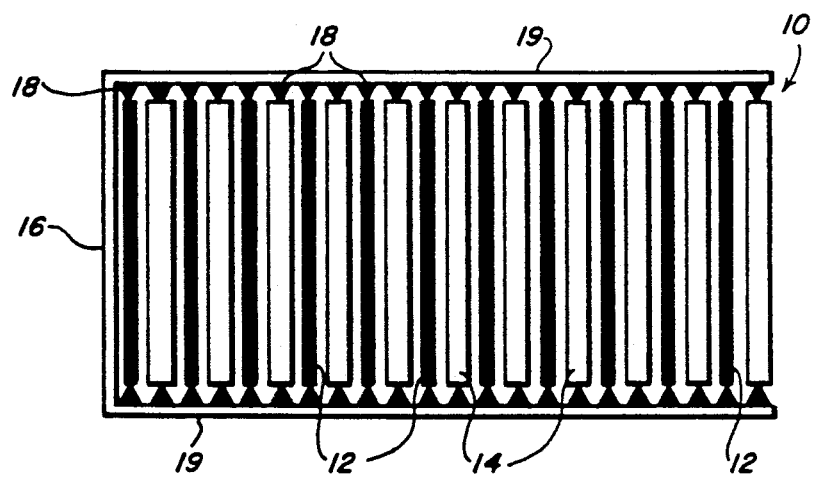
FIG. 1 shows, in elevational cross section, a component of the detector system of the present invention.

Referring now to the drawings, FIG. 1 shows, in elevational cross section, an assembly 10 which includes a plurality of charged particles detectors 12 alternately disposed between thick layers or disks 14 of a fast-fissionable material, all supported by an assembly support structure 16 having a plurality of support elements 18 which engage the peripheries of the charged particle detectors 12 and the disks 14 to support and properly position the detectors and disks. The support elements 18 are carried on members 19. To minimize interference with the neutrons, the support structure 16 desirably should be of the smallest possible mass. As an example only, the support elements 18 may be pointed pins made, for instance, of aluminum, which are attached to two or three aluminum rods or bars forming the members 19, to form an open or skeletal frame supporting the particle detectors 12 and disks 14.

The charged particle detectors 12 may be of solid state detector material which are known in the art, any other suitable as proportional counters. The layers or disks 14 of fissionable material must be an FFM. If $^{238}$U is used, the layers 14 may conveniently be disks cut from a sheet of $^{238}$U of suitable thickness, such as 1 mm. Each disk 14 is preferably the same area as the active area of the particle detector 12 to which it is to be mounted. While FIG. 1 shows a gap or spacing between the particle detector 12 and the adjacent surfaces of th disks 14, the disks may be mounted in direct contact with the surfaces of the charged particle detector.

To predict the performance based on the preliminary experiments, a detector built in accordance with the present invention should have 2 mm thick $^{238}$U disks as the FFM. This is because the preliminary experiments "sandwiched" a charged particle detector between two 1 mm thick disks. Therefore, to insure that each charqed particle detector in the present detector uniquely sees at least as much FFM, the disks must be 2 mm thick. An assembly 10 such as shown in FIG. 1 may have an arrangement containing 11 total tightly-packed disks 14 and 11 charged particle detectors 12 alternately disposed in a sandwiched fashion, and closely spaced together. A 7-8 MeV neutron at normal incidence to one face of the assembly 10 must travel through a total of 2.2 cm of $^{238}$U. This results in a 10% probability that the neutron will induce a fission in one of the disks 14. Experiments indicate that [18] 50% of these fission events will be detected in one of the charged particle detectors 12. Therefore, the overall probability that this 7-8 MeV neutron will be detected is ~5%. By increasing the number of disk/ detector sandwiches in the assembly 10, the probability will be increased that the neutron will induce a fission in one of the disks 14 and, thus, the overall probability of detecting the neutron will be increased.

It should be noted that the overall thickness of the $^{238}$U disks 14 (2.2 cm in the experimental prototype), the individual disk thickness (2 mm), the thickness of the charged particle detector 12 (not specified here), the spacing (if any) between each particle detector and $^{238}$U disk, and the assembly support structure 16 are not uniquely determined here. The 2 mm thickness for the $^{238}$U disks was chosen because it permitted estimates of detector performance to be made based upon experiments conducted by the inventor. The actual parameters for these and other components can be optimized based upon further experimentation.

Figure 2:
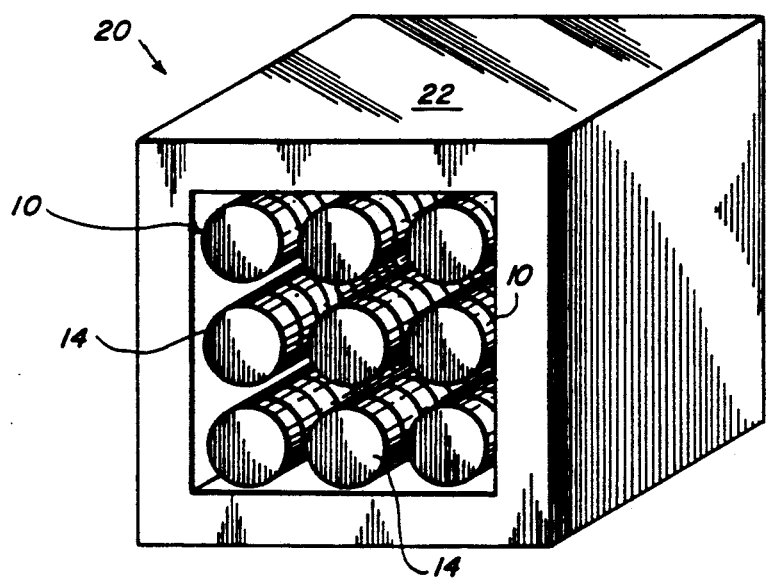
FIG. 2 is a perspective view of an embodiment of the detector system, with some components omitted to enhance clarity of the drawing.

A fast neutron detector 20 may be constructed by arranging a plurality of individual assemblies 10 (FIG. 1) in an array, and surrounding the entire array with a passive thermal neutron shield 22, which may be of $^{10}$B doped plastic, as shown in a 3×3 example array of FIG. 2. The front thermal neutron shielding 22 has been removed to show the array of assemblies.

Methods and materials for constructing passive thermal neutron shields are known, and a shield can be made such that slow/thermal neutrons are strongly shielded against while fast neutrons are not seriously affected. Surrounding the detector array with such a shield will further suppress the system's sensitivity to slow/thermal neutrons without seriously affecting its fast neutron detection capabilities.

There are at least two advantages to having the assemblies 10 arranged in an array. The most obvious is that it increases the effective surface area of the neutron detector 20. Perhaps less obvious is that since the neutron-induced fission reaction is a one-step process and since each charged particle detector 12 in the array is counting separately, there exists the possibility that by comparing relative count rates in the charged particle detectors the direction from which the neutron flux is incident upon the detector array can be determined. Such directional information would be very limited in the small array shown in FIG. 2. It is most likely that a much larger array would be needed to effectively exploit this possibility. To gauge the real possibilities for directional information, consideration must be given to the effects from fission neutrons and neutron scattering within the array.

Experiments were conducted using two 1 mm thick $^{238}U$ disks sandwiching a charged particle detector. The charged particle detector 12 used was a transmission-mounted silicon solid-state charged particle detector. The charged particle detector 12 used in most experiments was 2000 microns thick, although some experiments were run with thinner particle detectors to gauge what effect this might have. The $^{238}U$ disks 14 were obtained from 1 mm-thick sheets, with each disk cut to be the same size as the active area of the charged particle detector to which it was to be mounted. Each disk 14 was mounted in direct contact with the face of the charged particle detector 12, with a disk mounted on each side of the transmission-mounted particle detector 12.

Only one disk/charged particle detector sandwich was tested at a time. The sandwich was placed into a vacuum chamber, with one face of the sandwich parallel to a flat wall of the chamber, at a distance of 1 cm. The wall of the chamber was 1/16 inch-thick stainless steel. Two $^{252}Cf$ neutron sources were used in these experiments, both having been previously calibrated to be 136 and 582 $\mu$Ci. When a neutron source was in use, it was placed outside the vacuum chamber, and positioned normal to the center of the disk/charged particle detector sandwich. The distance between the neutron source and the disk/charged particle detector sandwich Was varied between 2 and 6 inches. When it was desired to moderate the neutron source, ¼ inch thick, 2 feet×2 feet polyethylene sheets were placed on the outside of the vacuum chamber, between the neutron source and the disk/charged particle detector sandwich.

Standard nuclear electronic equipments were used and included a solid state detector power supply, preamplifier, spectroscopy amplifier, and electronic pulser for calibration. The data were collected on a Nuclear Data ND66 multichannel analyzer with its own analog-to-digital converter. This equipment is commercially available. An $^{241}Am$ source was used as the calibration source for the charged particle detectors 12.

All experiments were performed following the same method. After setting up the disk/charged particle detector assembly in the vacuum chamber, a background spectrum was taken. This gave a spectrum of the natural background of the $^{238}U$ disks which is dominated by $\alpha$-particle and $\beta$-particle decay. The neutron source, and polyethylene sheets, if being used, were then put in place and a spectrum collected. The evacuated chamber was then opened and the disks removed. The charged particle detector was then replaced in the chamber without the disks, and a spectrum was collected. This wa done to check for the effects of the neutron flux on the charged particle detector. The neutron source was then removed and a spectrum was collected to check for any additional sources of background. (None were found.)

The detection events due to neutron-induced events in the $^{238}U$ disks were then determined by comparing the summed counts in the spectrum taken when both the $^{238}U$ disks and neutron source were present, with the other spectra taken. All spectra were taken for a length of time that assured a statistical accuracy of no worse than 0.5%. In actual practice this could vary anywhere between 20 minutes and several hours, depending on the parameters of the actual set-up in use at the particular time.

Many experimental parameters were varied: amplifier gain, low energy discriminator level, neutron source, amount (if any) of polyethylene for neutron flux moderation, disk/charged particle detector to neutron source distance, geometry of the local environment, and thickness of the charged particle detector. After each variation, spectra were taken following the experimental method just described above.

Some of the variations just mentioned require further explanation. When experimenting with neutrons, there is always concern that neutron scattering in the local environment can bias the results. To check for this, the environment around the experimental set-up was varied by moving objects and moving the set-up itself. The polyethylene moderator was used to help determine if the neutron-induced events in the disks were indeed due to the fast neutron component of the incident neutron flux, or if there was a significant contribution due to the slow/ thermal components of the flux. A low energy discriminator level was set on the signal from the solid state charged particle detector 12 in order to keep the experimental results fro being distorted by low energy noise. The thickness of the solid state charged particle detector 12 was varied to help determine that the effects being seen were due to charged particles from the $^{238}U$ disks being stopped in the charged particle detector, rather than being due to energy deposited by gamma rays passing through the charged particle detector After a series of initial tests, the amplifier gain was set to 8 MeV full scale and the lower level discriminator was set at 600 keV for the duration of the experiments. This discriminator setting was somewhat higher than absolutely necessary, but it was more important to insure a clean spectrum in the tests than to try and maximize event detection efficiency.

The first spectrum to be taken was a $^{238}U$ disk background when no source was present. The disk/charged particle detector background count rate, summed over the entire spectrum, was 584.6 ±0.4 counts/ second. The $^{238}U$ that was available and used in the experiments was not of a high isotopic purity, although it had been depleted of it's $^{235}U$ content, and thus this count rate is higher than would be expected using higher-purity isotopes which are currently available commercially. These higher-purity isotopes were eventually used in experiments, as will be described later.

Due to the high background count rate, a larger neutron source was used which was placed 2.5 inches from the neutron detector when taking neutron spectra in order to obtain good counting statistics. Although spectra were taken with the neutron source further away, the spectra required longer counting times and produced results with less statistical accuracy. However, they were consistent with the reported 2.5 inch results.

Figure 3:
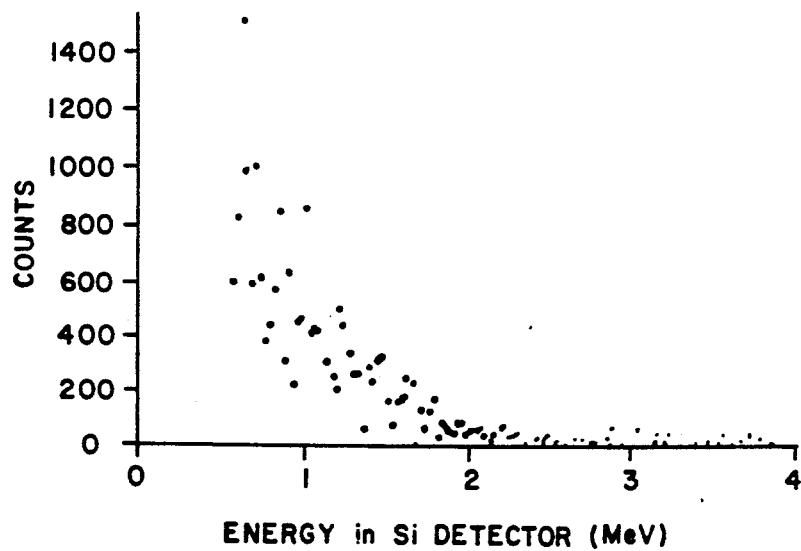
FIG. 3 shows a spectrum of counts in the charged particle detector of the system.

When spectra were taken with the strong neutron source 2.5 inches from the neutron detector, the count rate, summed over the entire spectrum, represented a 6.2±0.1% increase over the background counting rate. This is clearly a significant increase. Spectra that were collected in the presence of the neutron source, but without the $^{238}$U disks, showed a count rate that was 3.2±0.4% of the background counting rate. Comparing this with the result obtained when the disks were present shows that 3.0 ±0.4% of the increase in the count rate in the solid state charged particle detectors 12 can only be due to neutron-induced events in the $^{238}$U disks 14. This corresponds to a count rate of 17.5±2.3 counts per second in the charged particle detector. FIG. 3 shows one of the spectra of counts resulting from neutron-induced events in the $^{238}$U disks. This is a spectrum taken with the disks in and the neutron source present, minus spectra that were taken of the disk background and of the events due to neutron interactions in the charged particle detector.

During the experiments, the charged particle detectors were periodically checked with the $^{241}$Am source to assess possible effects from neutron damage. There was no evidence during the course of the experiments that the neutrons were adversely effecting the performance of the charged particle detectors. As noted above, the environment around the experimental set-up was varied. Each time this was done, the entire set of experiments was repeated. Using this method, no evidence was found that neutron scattering in the environment was biasing the results.

To confirm that the interactions seen in the $^{238}$J disks were indeed due to fast rather than slow/thermal neutrons, the experiments were repeated with polyethylene sheets between the neutron source and the disk/charged particle detector 12. Two total thicknesses of polyethylene were tested, ½ inch and 1 inch. With the ½ inch sheet, the bare source count rate increase of 3.0±0.4% over background was reduced to 2.0±0.4%. With the 1 inch sheet, the bare source count rate increase of 3.0±0.4% over background was reduced to 0.7±0.4%. Since the spectral composition of neutrons emitted by $^{252}$Cf is well known, the experimental results were compared with published data concerning the moderation of fast neutrons to determine if the results were consistent. This comparison showed that the behavior expected from the fast neutron component of a $^{252}$Cf flux passing through the polyethylene moderator was consistent with the experimental results. A similar comparison for the expected behavior of the slow/thermal flux was not made since this is a far more complex situation. The process of thermalization creates additional slow/thermal neutrons, and the local scattering environment becomes critically important in such calculations. It seems highly unlikely that the slow/thermal neutron flux would be varying exactly as the fast neutron flux can be expected to vary, especially since, as already mentioned, the experiments were insensitive to variations in the local scattering environment. Therefore, it is believed that the neutron-induced events in the $^{238}$U disks 14 that were observed were due to fast neutron inter-actions in the disk, with little apparent contribution from slow/thermal neutrons.

The 17.5±2.3 counts per second in the charged particle detector 12 that was found to be due to neutron-induced events in the $^{238}$U disks 14, was compared to the rate at which neutron-induced fissions were expected to be occurring in the disks. Since the dimensions of the source to disk/charged particle detector geometry were known and, as already mentioned, since the $^{252}$Cf neutron energy distribution is well known, it is then a fairly simple calculation to fold this distribution into the known cross section distribution for neutron-induced fission in $^{238}$U, and to obtain a fast neutron-induced fission rate in the disks 14.

Comparing this to the observed count rate indicates that 45% of the neutron-induced fissions in the $^{238}$U disks result in a signal in the charged particle detector 12. An accurate estimate of the error on this event detection efficiency number would require complex neutron scattering calculations. However, it is believed that this error is small enough to reliably state that the event detection efficiency for this disk/charged particle detector set-up is approximately 50%.

This approximate 50% event detection efficiency number can be used to estimate an overall fast neutron detection efficiency for the detector shown in FIGS. 1 and 2. Considering a flux of 7-8 MeV neutrons at normal incidence to the face of the detector array 10, a neutron from such a flux passing through the active area of the detector array will encounter a total thickness of $^{238}$U of 2.2 cm. This corresponds to a fission probability of 10%. Combining this with the event detection efficiency of approximately 50% results in a overall fast neutron detection efficiency of at least 5% for the detector.

As already mentioned, the $^{238}$U disks used in the preliminary experiments had a high intrinsic background that indicates they contain an impurity of some other isotope. The experiments of the preliminary work were essentially repeated later using pure samples of $^{238}$U. The new samples did not show the effect seen with the original samples. This means that $^{238}$U is not a usable FFM for this type of detector system. However, it also means that the contaminant in the original samples appears to be an appropriate FFM. This is not really surprising since, as was mentioned above, the only way to tell if an FFM is appropriate to this detector system is to test it. Unfortunately, since the contaminant in the original samples was unknown, detailed estimations can not be made of the efficiency for neutron detection that can be expected by using it in this detection scenario.

From the foregoing, it can be seen that a fast neutron threshold detector can be constructed using relatively-thick layers of an FFM and current charged particle detector technology. Since the FFM which produced the effect seen in the initial experiments is not known, it is impossible to make detailed efficiency calculations for the present invention. However, simply by comparing the known neutron flux with the detected count rate in those experiments shows that an efficiency of at least several percent can be expected when using that FFM in the present invention. Because of the array arrangement of the disk/charged particle detector assemblies, the neutron detector can supply information about the direction from which the fast neutron flux is incident. Also, this neutron detector can be extremely insensitive to slow/thermal neutrons.

To increase the overall fast neutron detection efficiency, the number of disk/charged particle detector layers can be increased. Also, the optimum parameters, i.e., disk and charged particle detector thickness, passive shielding types and thicknesses, etc., for this system can be determined experimentally, thus resulting in a more efficient system.

It is understood that many other changes and additional modifications of the invention are possible in view of the teachings herein without departing from the scope of the invention as defined in the appended claims.

I claim:

1. A fast neutron threshold detector comprising:
   a layer of a fast fissionable material having a significant cross section for neutron-induced fission produced by incident fast neutrons with energies of at least about 100 keV, said fast fissionable material being responsive to said incident fast neutrons with energies of at least about 100 keV for emitting electrons as a result of such fast neutron-induced fission; and
   means for detecting said electrons to produce a plurality of signal pulses proportional in number to the number of fast neutrons incident on said fast fissionable material.

2. The fast neutron threshold detector of claim 1 wherein:
   said layer of fast fissionable material has a thickness on the order of 1 mm.

3. The fast neutron threshold detector of claim 1 further including:
   a second layer of a fast fissionable material having a significant cross section for neutron-induced fission produced by incident fast neutrons with energies of at least about 100 keV;
   said detecting means being disposed between said layer and said second layer of fast fissionable materials.

4. The fast neutrons threshold detector of claim 3 wherein:
   said layer and said second layer of fast fissionable materials are of the same fissionable material, and each of said layers has a thickness on the order of 1 mm.

5. The fast neutron threshold detector of claim 4 wherein:
   said detecting means is a charged particle detector material.

6. The fast neutron threshold detector of claim 4 wherein:
   said detecting means is a proportional counter.

7. A high efficiency fast neutron threshold detector comprising:
   a plurality of adjacently-positioned neutron detecting devices, each of said neutron detecting devices including:
      a plurality of adjacently-positioned layers of fast fissionable material, each layer having a significant cross section for neutron-induced fission produced by incident fast neutrons with energies of at least about 100 keV, said fissionable material being responsive to said incident fast neutrons for emitting electrons as a result of such fast neuron-induced fission; and
      a plurality of detectors sequentially interleaved with said plurality of adjacently-positioned layers of fissionable material such that each of said detectors is disposed between adjacent layers of fissionable material, each of said plurality of detectors detecting electrons from said adjacently-positioned layers of fissionable material to produce a plurality of signal pulses proportional in number to the number of fast neutrons incident on at least one of said adjacently-positioned layers of fissionable material.

8. The high efficiency fast neutron threshold detector of claim 7 further including:
   a support structure to support and position said plurality of neutron detecting devices, same support structure having a structural configuration offering minimum interference with the passage of neutrons through the fast neutron threshold detector.

9. The high efficiency fast neutron threshold detector of claim 8 wherein:
   each of said plurality of detectors is comprised of a charged particle detector material and each of said layers of fissionable material has a thickness on the order of 1 mm.

10. The high efficiency fast neutron threshold detector of claim 8 wherein:
    each of said plurality of detectors is a proportional counter.

11. A high efficiency fast neutron threshold detector comprising:
    an enclosure of a passive thermal neutron shielding material; and
    an array of neutron detecting assemblies within said enclosure, each of said neutron detecting assemblies comprising a support structure and a plurality of adjacently-positioned neutron detecting devices supported by said support structure, each of said neutron detecting devices including:
       a plurality of adjacently-positioned layers of fast fissionable material, each layer having a significant cross section for neutron-induced fission produced by incident fast neutrons with energies of at least about 100 keV, said fissionable material being responsive to said incident fast neutrons for emitting electrons as a result of such fast neutron-induced fission; and
       a plurality of detectors sequentially interleaved with said plurality of adjacently-positioned layers of fissionable material such that each of said detectors is disposed between adjacent layers of fissionable material, each of said plurality of detectors detecting electrons from said adjacently-positioned layers of fissionable material to produce a plurality of signal pulses proportional in number to the number of fast neutrons incident on at least one of said adjacently-positioned layers of fissionable material.

12. The high efficiency fast neutron threshold detector of claim 11 wherein:
    said support structure has a structural configuration offering minimum interference with the passage of neutrons through the fast neutron threshold detector.

13. The high efficiency fast neutron threshold detector of claim 12 wherein:
    each of said plurality of detectors is comprised of a charged particle detector material and each of said layers of fissionable material has a thickness on the order of 1 mm.

14. The high efficiency fast neutron threshold detector of claim 12 wherein:
    each of said plurality of detectors is a proportional counter and each of said layers of fissionable material has a thickness on the order of 1 mm.

* * * * *